March 5, 1963 F. M. HAGMANN ET AL 3,079,651
THREE-DIMENSIONAL SEAL
Filed May 31, 1960 2 Sheets-Sheet 1
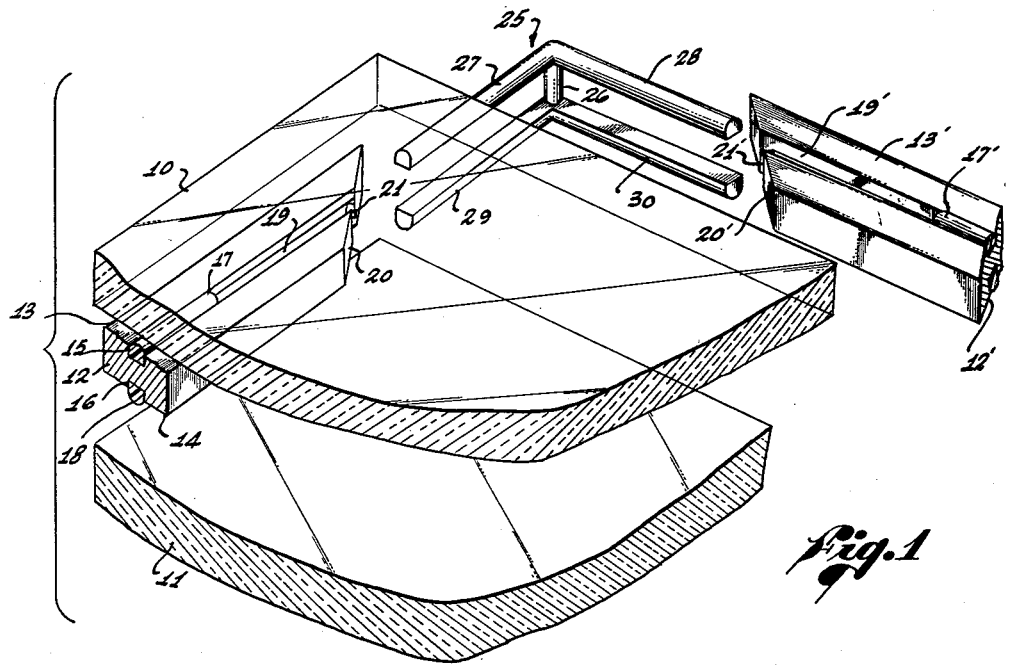
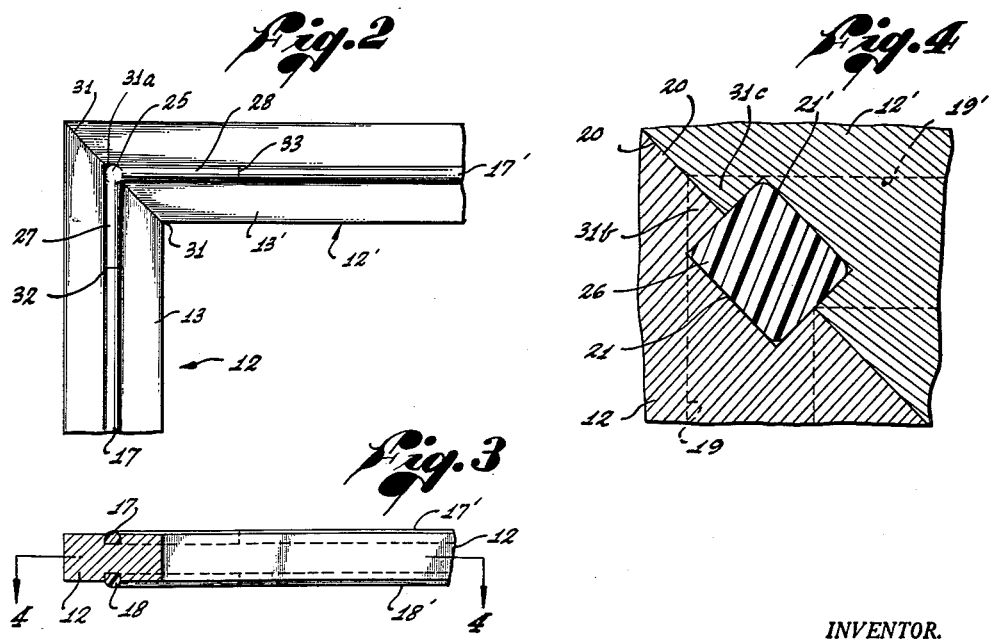
INVENTOR.
FOSTER M. HAGMANN
HAZEN B. GRAHAM
ROBERT B. MORRIS
BY Fulwider Mattingly & Huntley
Attorneys March 5, 1963  F. M. HAGMANN ET AL  3,079,651
THREE-DIMENSIONAL SEAL Filed May 31, 1960  2 Sheets-Sheet 2

INVENTORS
FOSTER M. HAGMANN
HAZEN B. GRAHAM
ROBERT B. MORRIS
BY Fulwider Mattingly & Huntley
Attorneys

United States Patent Office 3,079,651
Patented Mar. 5, 1963

3,079,651
THREE-DIMENSIONAL SEAL
Foster M. Hagmann, Santa Monica, Hazen B. Graham, Inglewood, and Robert B. Morris, Woodland Hills, Calif.; said Graham and said Morris assignors of seven and one-third percent to said Hagmann, and seven percent to Wanda L. Pratt, both of Santa Monica, Calif.
Filed May 31, 1960, Ser. No. 32,665
8 Claims. (Cl. 20—56.5)

This invention relates generally to sealing means, and more particularly to a three-dimensional sealing means of resilient material coacting with a pair of abutting spacing and sealing strips to form a corner sealing assembly between opposed mating parts.

One particular application to which the sealing corner assembly of this invention is well suited, is that of the assembly of double paned glass windows, in which a sealed dead air or evacuated space is to be maintained between the panes. In practice, it is desirable to assemble such window structures at or near the point of final use in order to minimize shipping problems. However, it has in the past been extremely difficult to obtain an efficient corner seal for such windows which could be assembled without special tools, by unskilled workers, and in a simple manner which does not afford opportunity for erroneous shaping or imperfect sealing relationships.

More generally, it has in the past been common to rely upon a simple butt joint between both the spacer-retaining bodies and the sealing member itself at the corners of angular or rectilinear assemblies. That is to say, strip seal members extending longitudinally along the sides of the window would either simply abut against each other or abut against a corner member leaving an imperfectly sealed leakage path in the plane of the butt joint. This imperfect seal arises from the fact that prior art sealing members have been essentially two-dimensional in the sense that each individual sealing member (such as the strip sealing member usually mounted in the spacer-retainer) provided only for a seal between the retaining strip and the opposed part, such as one pane of glass or for a seal between abutting retaining strips.

It is, therefore, one specific object of this invention to provide a three-dimensional seal such that any necessary butt joints between members of sealing material will be substantially remote from the plane of the corner butt joint between retaining members to thereby substantially eliminate the leakage path at the corner.

It is a further object of this invention to provide a molded three-dimensional sealing member of resilient material.

It is a still further object of this invention to provide such a molded three-dimensional member which is shaped and dimensioned to be received in grooves recessed in sealing strips to form therewith a corner sealing assembly.

It is a more particular object of this invention to provide a spacing and corner sealing assembly for use between opposed mating parts in which there is no leakage path at said corner.

A further object of this invention is to provide a three-dimensional sealing means coacting with longitudinally extending sealing strips to form an improved corner seal assembly between opposed mating parts, such as the panes of a dual pane window.

A still further object of this invention is to provide such an assembly which can be easily and simply assembled at the point of use without special tools or skills.

Briefly, in accordance with one feature of this invention, these and other objects and advantages are obtained by providing a sealing strip for each edge of the window panes or other opposed parts, which strip is mitered at each end to an angle, such as to form a butt joint with a similar strip disposed along an adjacent edge. The retaining body of each strip has longitudinally extending grooves on opposed surfaces thereof and the end of each body is provided with a vertically extending groove which connects the longitudinally extending grooves. The central portion of each groove has a resilient packing member molded therein, leaving voids at the ends of the grooves. There is additionally provided a three-dimensional sealing means molded of resilient material which is shipped unassembled and which is shaped so that it fits into the mating opposed end grooves and extends along the voids near the ends of the longitudinal grooves, so that the butt joint formed at the corner is completely sealed and the joint between the strips of sealing material is placed at a location remote from the corner itself to preclude the formation of a leakage path.

Other objects, features, and advantages of the present invention will be more fully apparent to those skilled in the art from the following detailed description taken in connection with the accompanying drawings, in which like reference characters refer to like parts throughout and wherein:

FIGURE 1 is a broken away exploded perspective view, showing the corners of the two opposed panes of a dual pane window between which the illustrated members are to be assembled to form a corner seal assembly.

FIGURE 2 is a top plan view, partly broken away, of the corner sealing assembly.

FIGURE 3 is a side view of the assembly shown in FIGURE 2.

FIGURE 4 is a sectional view taken along the line 4—4 of FIGURE 3.

Figure 7:
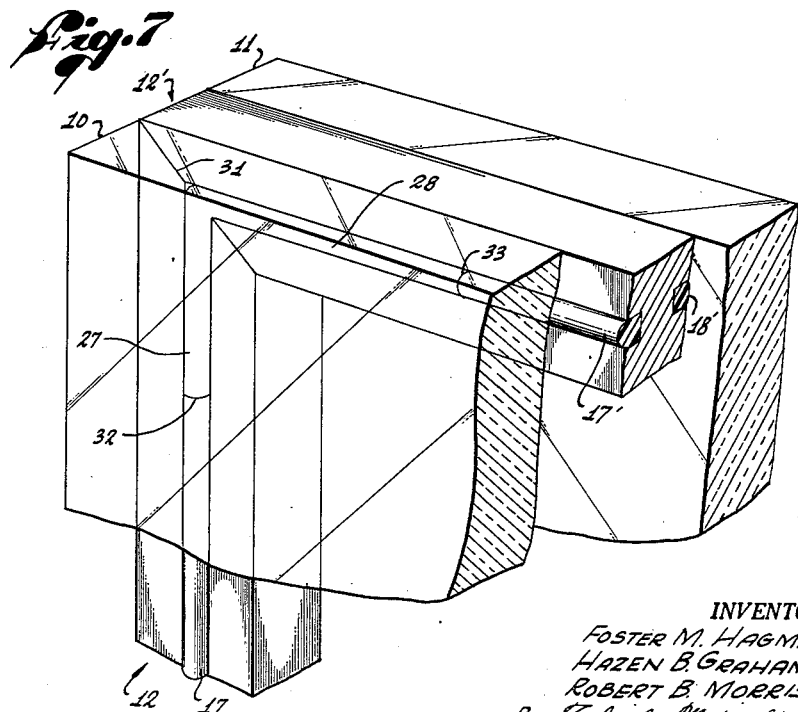
FIGURE 7 is a perspective view showing the sealing assembly in engaged operative relationship between the corners of two panes of glass.

Turning now to the drawings, and in particular to FIGURE 1 thereof, there will be seen first and second panes of glass 10 and 11, repectively, which are to be assembled and held in spaced opposed relationship between any conventional outer frame member which, for clarity of illustration, is not shown in the drawing. It will be understood that the outer edging or frame member which holds the completed assembly together as shown in FIGURE 7, forms no part of the present invention and, consequently, is omitted from both FIGURES 1 and 7.

The two panes of glass 10 and 11 are held in spaced opposed relationship by sealing strips which extend along each side or edge of the pane of glass. It will be understood that in both FIGURES 1 and 7 the structure is broken away to show only the corner assembly embodying the seal of the present invention. In any normally rectilinear structure, there will be, of course, four such corner assemblies. Each corner seal assembly is formed between the mitered ends of the sealing strips for each of two adjacent sides.

In particular, it will be noted from FIGURE 1 that one such sealing strip is formed by a linear retaining body 12, whereas the second such strip coacting to form the corner assembly, is shown at 12'. It will be understood that in cross section the retaining bodies 12 and 12' of the coacting adjacent sealing strips are identical. These strips may differ in length for use with window or door structures having any desired dimensions, but in their thicknesses and cross section they are completely alike and interchangeable.

The linear retaining body 12 has substantially opposed part engaging surfaces 13 and 14, respectively. Each of said surfaces is provided with a longitudinally extending groove. Thus, the top surface of retaining body 12 is provided with longitudinally extending grooves 15, whereas the bottom surface 14 is provided with a similar groove 16.

A resilient packing or sealing member 17 is positioned in groove 15 and a similar resilient packing member 18 is positioned in groove 16. This strip may be separately extruded or it may be molded in place. These resilient packing or sealing members are fitted into the groove so that the bottom of the sealing member fills the bottom of the groove, whereas an outer projection extends beyond the surface of the retaining body for sealing engagement with one of the opposed parts, such as the window pane 10. The packing members 17 and 18 extend longitudinally continuously throughout the central portion of the grooves and terminate a predetermined distance short of each end of the groove to form a void terminal groove portion, such as the groove 19 portion at the end of each groove.

It will be noted that members 17 and 18 are rounded at their tops, thus leaving a void at the edge of the rectangular groove. The volume per unit length of this void is equal to or slightly less than the volume of the projecting portion of the seal member in order to assure proper sealing action.

It will be understood that each of the sealing strips is symmetrical in the sense that each end is the same. Consequently, the drawings are broken away to show only one end of each of two adjacent strips. Since these two ends are complete identical mirror images of each other, the corresponding portions of the second sealing strip are indicated by prime reference characters, otherwise identical with those used for the first strip.

It will be noted that the end of the strip 12 is mitered at a 45° angle to form an end surface 20, whereas the end of strip 12′ is similarly mitered to a complementary 45° angle forming an end surface 20′ which is adapted to seat against the surface 20 to form a rectangular corner butt joint. It will, of course, be understood that although two 45° angles are shown for the abutting surfaces, other angles could be used where it is desired to form a corner of other than 90°. Furthermore, two adjacent strips lying along the same straight line can, if desired be joined together by a similar construction using strips themselves, having rectangular ends. In practice, however, the preferred embodiment of the invention is that shown wherein the ends of the strips are provided with a mitered 45° angle so that the strips abut to form a 90° corner.

Figure 5:
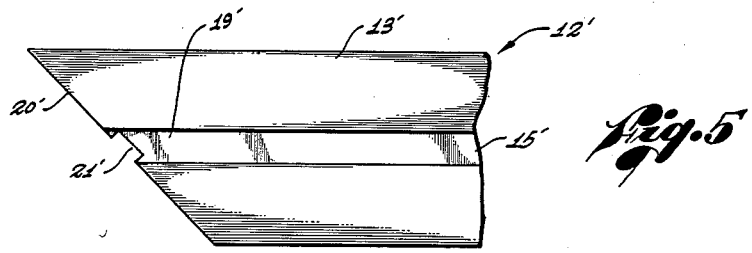
FIGURE 5 is a top view of the grooved linear retaining body without the sealing material therein and showing the vertically extending connector groove at the end thereof.

In the end surface 20, there is provided a vertical connector groove 21 and a similar connector groove 21′ is provided in the end surface 20′. It will be noted, particularly from FIGURE 5, that the groove 21′, for example, has the same width and depth (as seen in the plane of FIGURE 4) as the groove 15′ and is cut perpendicularly into the angled surface 20′. The vertical connector groove 21 interconnects the longitudinally extending grooves 15 and 16 on the opposed surfaces of the retaining body at the void terminal portions of these grooves which are not occupied by the sealing material molded therein.

Figure 6:
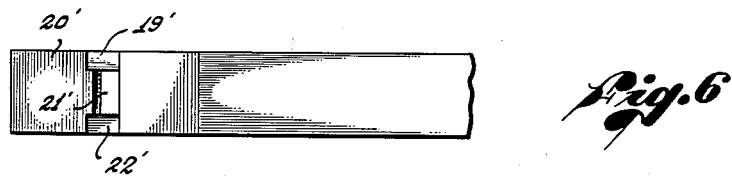
FIGURE 6 is a side view of the linear retaining body shown in FIGURE 5.

There is thus formed a continuous void groove, as may be most clearly seen in FIGURE 6, which comprises the upper void terminal groove 19′, the end vertical connector groove 21′, and the lower terminal void groove section 22′.

These void interconnected groove sections on the opposed retaining bodies form a space which receives the molded three-dimensional sealing means 25, best seen in its entirety in the exploded perspective view of FIGURE 1.

The three-dimensional sealing means 25 is molded from resilient, deformable material, such as a plastisol, rubber, or the like, and includes a vertically extending connector member 26. Extending horizontally from the top of the vertical connector member 26 are a pair of orthogonally intersecting members 27 and 28, respectively, which intersect perpendicularly or orthogonally at the top of the vertical connector member 26 and extend away from it in one direction only, the horizontal members each terminating on the opposite edge of the top of member 26.

Similarly, at the bottom of the vertical connector member 26 is a second pair of horizontally extending members 29 and 30. These members also intersect orthogonally at the bottom of the vertical member 26 and terminate on the opposite side thereof. The members 27, 28, 29 and 30, each have preferably substantially the same length and corresponding members of each pair of members extend in the same direction in generally opposed parallel relations ip to each other. That is to say, the member 27 extends in the same direction as the member 29 and is in generally opposed parallel relationship thereto, and a similar relationship exists between the members 28 and 30.

The vertical connector member 26 is adapted to be seated in and compressed between the grooves 21 and 21′ which are brought into opposed mating relations ip when the device is assembled, as may be seen particularly in FIGURE 4. The width of the groove is made equal to the diameter of the vertical connector member 26 which connector member has a circular cross section in the uncompressed state seen in FIGURE 1. Since the total depth of the vertical groove is less than its width (hence less than the diameter), the round connector is compressed to the shape shown in FIGURE 4 when in assembled sealing relation. The void spaces at each of the four corners of the vertical groove afford a safety factor to prevent over-occupation of the seal in the groove.

The horizontally extending members 27 and 28 intersect at the top of the vertical connector 26 to form a sharp right angle or square corner on the inner side. The opposite or outer corner of the intersection is rounded or radiused to afford tolerance for seating in the groove. The intersection of members 29 and 30 at the bottom of the connector is similar. Top and bottom are thus fully sealed.

The vertical strip 26 is slightly longer than the height of the vertical connector groove 21. This excess height coacts with the void corner 31a (FIGURE 2) by the above-noted rounded seal corner to accommodate varying combinations of tolerances in the cutting of the grooves. Corner 31a is above shoulders 31b and 31c (FIGURE 4) and hence need not be filled to seal.

Thus, if the vertical grooves are both slightly too small this excess height or length of the vertical strip will be deformed into the normally void corner. However, if the grooves are both too large, this excess height will be compressed by the window panes so as to fill the oversized grooves. The excess material will flow first into over-sized grooves if possible before it has a tendency to flow into the normally void corner. The rounded shape tends to pull the material inwardly from all directions and hence it must be urged outwardly from all directions in order to be urged into the void corner.

The horizontally extending members 27 and 29 are otherwise shaped and dimensioned the same as strips 17 and 18 to thus fit the terminal void portions in the longitudinally extending grooves on the upper and lower surfaces, respectively of the retaining bodies. For example, member 27 is adapted to be sealingly seated and retained in the terminal end portion 19 of the groove 15. Similarly, each of the other members of the three-dimensional seal means is adapted to be seated in its corresponding groove.

Thus, as may be seen in FIGURES 2 and 7, a butt joint is formed at plane 31 between the surfaces 20 and 20′, when the sealing strips 12 and 12′ are placed in assembled relationship about the three-dimensional seal means 25. However, the end of horizontally extending member 27 forms a butt joint with the end of its mated sealing means 17 in the groove 15 at the plane 32, which is remote from the plane 31 of the corner butt joint between the retaining bodies.

Similarly, of course, the member 28 forms a butt joint 33 with the member 17' at a distance which is also removed or remote from the corner joint 31.

The fact that the butt joints 32 and 33 between the ends of the sealing strips are removed by a distance equal to the length of the horizontally extending members from the butt joint formed at the mitered corner, has been found to very effectively prevent leakage through the corner sealing assembly. The plane 31 of the butt joint of the retaining members 12 and 12' is itself completely sealed by the vertically extending connector member 26 extending transversely across it, as may be most clearly seen in FIGURE 4. Of course, the fact that the horizontally extending arm members 27, 28, 29 and 30 are integrally molded to and are continuous with the vertical member 26 prevents any possibility of leakage through the three-dimensional seal structure.

Furthermore, it will be understood that in commercial practice each of the sealing strips, regardless of what standard length it may be manufactured in, is provided with void terminal or end grooves, such as the grooves 19, which are of a standard predetermined length which may conveniently, for example, be 1". Similarly, the horizontally extending members are each of this same predetermined length, so that they will exactly fit into and snugly abut against the resilient packing or sealing member molded into the central portions of each of the grooves.

Hence, when a dual pane window, for example, is to be assembled to provide a sealed dead air space between the panes 10 and 11, it is only necessary to provide one of the three-dimensional seal means 25 for each of the four corners and to fit the horizontally extending arm members thereof into the longitudinal grooves in the retainer bodies and to fit the vertical connector member 26 between the grooves 21 and 21' as adjacent sealing strips 12 and 12' are fitted together from the disassembled relationship shown in FIGURE 1 to the assembled relationship shown in FIGURE 7.

In this type of assembly, there is no room for error by the workman assembling it, since all parts are precut to size. The workman assembling the parts has no cutting, shaping, or sizing to do. Furthermore, all of the parts are secured together by a simple forced fit and can thus be assembled manually without any tools whatsoever. Of course, after the four corner assemblies have been placed in assembled relationship, the entire framework formed by the four sealing strips is placed between the two panes of glass to hold them in opposed spaced parallel relationship and the sandwich thus formed is then placed in any conventional framework to hold it in position.

In practice, it is desired to form the three-dimensional seal member and the resilient packing material from the same type of synthetic resinous plastic material and to make the retaining bodies 12 and 12' of aluminum or other light weight, easily worked material. It will, however, be understood that any suitable materials can be used.

While a particular exemplary preferred embodiment of the invention has been described in detail above, it will be understood that modifications and variations therein may be effected without departing from the true spirit and scope of the novel concepts of the present invention, as defined by the following claims.

We claim:

1. A sealing strip for use in forming a corner seal between opposed mating parts which comprises: a linear retaining body having substantially opposed part engaging surfaces, said surfaces each being provided with a longitudinally extending groove; a resilient, deformable packing member in each of said grooves with a bottom portion partially filling its associated groove and an outer projection extending beyond the corresponding surface of said body for engagement with one of said parts, the volume per unit length of the outer projection of each of said packing elements being substantially equal to, but no greater than, the volume per unit length of the void remaining within its associated groove, each of said packing members extending continuously in the central longitudinal portion of its associated groove and terminating a predetermined distance short of each end thereof to form a void terminal groove portion at each said end; said retaining body having each of its ends shaped to coact with a complementary end of a similar body to form a corner joint; a vertical groove interconnecting said void portions of said longitudinally extending grooves at each of said ends; said vertical groove being shaped and positioned to coact with said void terminal portions of said longitudinally extending grooves to receive a separate three-dimensional sealing member to seal said corner joint.

2. A corner sealing assembly comprising: first and second grooved longitudinally extending sealing strips having their ends mitered to complementary angles to form a butt corner joint; and three-dimensonal sealing means of resilient, deformable material having a portion compressed between the ends of said strips at said joint to seal said joint and having other portions extending longitudinally a predetermined distance along each of said grooved strips, said other portions being seated in said grooves with portions projecting therefrom to form a continuous seal extending away from said corner joint.

3. A sealing assembly forming a corner seal between opposed mating parts comprising: first and second longitudinally extending sealing strips having their ends mitered to complementary angles and positioned to form a corner butt joint; a molded three-dimensional sealing means of resilient material positioned between said strips to form a seal for said joint; each of said strips comprising a linear retaining body having substantially opposed part engaging surfaces, said surfaces each being provided with a longitudinally extending groove; a resilient packing member molded in each of said grooves with a bottom portion filling the bottom of said groove and an outer projection extending beyond the surface of said body for engagement with one of said parts, said packing member extending continuously in the central longitudinal portion of said groove and terminating a predetermined distance short of each end of said groove to form a void terminal groove portion at each said end; said retaining body having each of its ends mitered to form said complementary angle; a vertically extending groove in said mitered end surface interconnecting said void portions of said longitudinally extending grooves; said molded three-dimensional sealing means comprising a vertically extending elongated member and two pairs of horizontally extending elongated members, the members of said horizontally extending pairs intersecting orthogonally at the top of said vertical member and the members of the other of said horizontally extending pairs intersecting orthogonally at the bottom of said vertical member; said vertical member being received in and compressed between the vertical grooves in the ends of said abutting strips and said pairs of horizontally extending members being seated in said void portions of said longitudinally extending grooves in said retaining bodies of said strips to form butt joints with said centrally extending packing members, thus being remote from said corner joint by a distance equal to the length of said pairs of horizontally extending members of said three-dimensional seal.

4. A corner sealing assembly comprising: a butt joint formed between the ends of elongated sealing strips extending away from said joint at an angle to each other;

opposed mating grooves in the contiguous ends of said sealing strips forming the plane of said joint; longitudinally extending grooves in the side walls of said strips connected with corresponding ones of said opposing mating grooves; a sealing member positioned to occupy both of said grooves simultaneously to form a seal for the plane of said butt joint; and additional sealing means integral with said member and seated in said longitudinally extending grooves.

5. A sealing assembly comprising: first and second longitudinally extending strip seal supports having oppositely facing part engaging surfaces and end surfaces arranged in contiguous relationship to form a butt joint, each of said supports having a groove in its end surface extending between said part engaging surfaces, the grooves in the respective supports mating with one another; and three-dimensional sealing means formed of a resilient, deformable material and having a first portion deformed into and confined entirely within said mating grooves to prevent leakage through the plane of said butt joint and having other portions integral with said first portion and extending longitudinally away from the plane of said butt joint along the part engaging surfaces of said strip seal supports.

6. A sealing assembly for forming a corner seal between opposed parts comprising: first and second longitudinally extending sealing strips having their ends mitered and positioned to form a corner butt joint, each of said strips having opposed part engaging surfaces with longitudinally extending grooves opening to its mitered end and a transversely extending groove at its mitered end connecting said longitudinally extending grooves, the transversely extending grooves on said first and second strips being aligned opposite one another when said strips are positioned as aforesaid; and integral sealing means formed of a resilient deformable material adapted to cooperate with said first and second strips to provide a three-dimensional corner seal between said opposed parts, said sealing means including a first elongated member confined in a deformed state within said aligned and transversely extending grooves, and first and second pairs of elongated members, the members of each of said pairs intersecting and joining with said first elongated member at one of its ends and being receivable in corresponding ones of said longitudinally extending grooves in said first and second strips with portions originally projecting therefrom, the projecting portions being adapted to be deformed into and confined within said longitudinally extending grooves when said opposed mating parts are urged into sealing relationship with said part engaging surfaces.

7. A sealing assembly for forming a corner seal between a pair of opposed and spaced apart parts comprising: first and second longitudinally extending sealing strips arranged with one pair of ends mating to form a butt joint, each of said strips comprising a retainer body having substantially opposed part engaging surfaces with longitudinally extending grooves and a transversely extending groove in its mating end, the transversely extending grooves on said first and second strips mating when said strips are so arranged; a resilient, deformable packing element fitted into each of said longitudinally extending grooves with a portion extending outwardly therefrom and adapted to be engaged by a part to be sealed and deformed into and confined entirely within its associated groove, said packing element extending continuously in the central longitudinal portion of its groove and terminating a predetermined distance short of the mating end of the strip to form a void terminal groove portion at each said end; and integral sealing means formed of a resilient, deformable material and including a first elongated member and two pairs of elongated members, the members of one of said pairs being substantially equal in length to said predetermined distance and joining each other at one end of said first member and the members of the other of said pairs being substantially equal in length to said predetermined distance and joining each other at the other end of said first member, said first member being confined between the mating and transversely extending grooves in said first and second strips and said pairs of elongated members being seated in the void terminal groove portions of said longitudinally extending grooves, the members of said pairs having portions projecting outwardly of their associated grooves and adapted to be deformed into and confined within said last-mentioned grooves.

8. A sealing assembly as in claim 7 wherein the volume per unit length of said packing element is substantially equal to, but no greater than, the volume per unit length of the central portion of its associated longitudinally extending groove, and the volume per unit length of each of the members of said pairs is substantially equal to, but no greater than, the volume per unit length of the terminal groove portions of their associated longitudinally extending grooves.

References Cited in the file of this patent

UNITED STATES PATENTS

| | | |
|---|---|---|
| 1,658,282 | Bray | Feb. 7, 1928 |
| 2,373,762 | Krehbiel | Apr. 17, 1945 |
| 2,587,471 | Hess | Feb. 26, 1952 |
| 2,714,944 | Bongiovanni | Aug. 9, 1955 |
| 2,717,667 | Bancroft | Sept. 13, 1955 |
| 2,894,579 | Rust et al. | July 14, 1959 |

FOREIGN PATENTS

| | | |
|---|---|---|
| 159,350 | Sweden | Apr. 14, 1953 |